United States Patent [19]
Umemoto et al.

[11] Patent Number: 5,998,096
[45] Date of Patent: Dec. 7, 1999

[54] PROCESS FOR PRODUCING POLYMERIZATION OR CROSSLINKING RATE-DISTRIBUTED ARTICLE AND PROCESS FOR PRODUCING LENS, LENS ARRAY OR WAVEGUIDE USING THE PROCESS

[75] Inventors: Seiji Umemoto; Yasuo Fujimura; Kazutaka Hara; Suguru Yamamoto, all of Osaka, Japan

[73] Assignee: Nitto Denko Corporation, Osaka, Japan

[21] Appl. No.: 08/886,422

[22] Filed: Jul. 1, 1997

Related U.S. Application Data

[63] Continuation of application No. 08/511,913, Aug. 7, 1995, which is a continuation of application No. 08/077,036, Jun. 16, 1993.

[30] Foreign Application Priority Data

Jun. 17, 1992 [JP] Japan .................................... 4-183021
Aug. 25, 1992 [JP] Japan .................................... 4-250589

[51] Int. Cl.$^6$ ............................ G03C 1/725; G03C 5/56; G02B 3/00; C08F 2/46
[52] U.S. Cl. .................................... 430/281.1; 430/286.1; 430/290; 522/2; 522/120; 522/144; 522/182; 359/642; 359/652
[58] Field of Search ............................... 522/2, 120, 144, 522/182; 430/281.1, 286.1, 290; 250/492.1, 492.22; 359/652–655; 385/141–145

[56] References Cited

U.S. PATENT DOCUMENTS

| | | | |
|---|---|---|---|
| 3,477,932 | 11/1969 | Parts et al. | 522/2 |
| 3,809,686 | 5/1974 | Chandross et al. | 522/2 |
| 4,248,959 | 2/1981 | Jeffers et al. | 522/2 |
| 4,287,277 | 9/1981 | Matsumoto et al. | 522/2 |
| 4,712,854 | 12/1987 | Mikami et al. | 350/96.12 |
| 4,942,112 | 7/1990 | Monroe et al. | 430/282 |
| 5,164,223 | 11/1992 | Tsujino et al. | 427/520 |
| 5,191,358 | 3/1993 | Iwasaki | 346/107 R |
| 5,541,247 | 7/1996 | Koike | 524/285 |

FOREIGN PATENT DOCUMENTS 1348911   3/1974   United Kingdom .

*Primary Examiner*—Susan W. Berman
*Attorney, Agent, or Firm*—Sughrue, Mion, Zinn, Macpeak & Seas, PLLC

[57] ABSTRACT

A process for producing a polymer or a crosslinked article having a region in which the polymerization rate or crosslinking rate is varied is disclosed, comprising irradiating a photopolymerizable substance or photo-crosslinkable substance with laser light having an uneven distribution of intensity. The process is suitable for mass production of polymerization rate- or crosslinking rate-distributed articles. An arbitrary distribution pattern can be designed and formed under good control, and distribution regions having a fine shape can be formed with excellent precision. A plurality of distribution regions having a regular shape can be formed at a high density with high precision.

5 Claims, 10 Drawing Sheets

PROCESS FOR PRODUCING POLYMERIZATION OR CROSSLINKING RATE-DISTRIBUTED ARTICLE AND PROCESS FOR PRODUCING LENS, LENS ARRAY OR WAVEGUIDE USING THE PROCESS

This is a Continuation of application Ser. No. 08/511,913 filed Aug. 7, 1995, which is a Continuation of application Ser. No. 08/077,036 filed Jun. 16, 1993.

FIELD OF THE INVENTION

This invention relates to a process for producing a polymer having an uneven distribution of a polymerization rate or a crosslinked article having an uneven distribution of a crosslinking rate. The process is applicable to formation of microlenses having an uneven distribution of refractive index.

BACKGROUND OF THE INVENTION

It is known that a polymer having an uneven distribution of a polymerization rate, i.e., a polymer with its polymerization rate varied depending on location within the polymer (hereinafter referred to as polymerization rate-distributed polymer) can be obtained by impregnating a polymerizable monomer into a substrate with a concentration gradient, followed by polymerization. According to this technique, however, the impregnated monomer concentration shows a diffusion distribution having the highest concentration in the periphery of the substrate, and it is difficult to provide a highly concentrated region at a prescribed position, e.g., inside the substrate. That is, the process has a narrow freedom of polymerization rate distribution.

A modification of the above-described process has been proposed, in which part of the surface of a substrate is covered with an impermeable mask to control the site where a polymerizable monomer is impregnated. However, this modification makes no difference in terms of diffusion distribution from the site of impregnation toward the surroundings, and the freedom of polymerization rate distribution is still limited. Therefore, whichever process one may choose, a concentration distribution is determined by the type of substrate and polymerizable monomer and environmental conditions. The processes are difficult to control, freedom of the possible pattern of polymerization rate distribution is extremely narrow, and there are difficulties in controlling distribution mode and in freely designing polymerization rate-distributed regions.

On the other hand, it has been proposed to expose a photopolymerizable compound or a photo-crosslinkable compound to light through an optical mask having a binary pattern having openings at varied intervals to produce a polymerization rate-distributed polymer or a crosslinked article with its crosslinking rate unevenly distributed (hereinafter referred to as a crosslinking rate-distributed article) based on the areas of the irradiated portions (exposure portions) and unirradiated portions (non-exposure portions). However, this process is disadvantageous in that preparation of such an optical mask requires much time and labor, an optical mask must be prepared for every pattern of proposed distribution, and incident light is diffracted by the optical mask, resulting in poor reproduction precision of distribution. In particular, the diffraction of light becomes greater as the pattern is made finer. Therefore, the process lacks reproducibility in forming fine regions needing highly precise control as in the formation of microlenses.

SUMMARY OF THE INVENTION

One object of the present invention is to provide a process for producing a polymerization or crosslinking rate-distributed article, which process is excellent in controllability of distribution mode, freedom in designing a distribution mode, fineness of the pattern, precision of distribution, and suitability to mass production.

Another object of the present invention is to provide a process for producing a lens, a lens array or a waveguide by application of the above process.

The above objects of the present invention are accomplished by (1) a process for producing a polymer or a crosslinked article comprising irradiating a matrix base containing a photo-reactive substance with laser light having an uneven distribution of intensity to form a region in which polymerization rate or crosslinking rate is varied, (2) a process for producing a lens or a lens array comprising irradiating laser light having an uneven distribution of intensity on at least one site of a transparent matrix base containing a photo-reactive substance to form at least one region in which a polymerization rate or a crosslinking rate is varied, and (3) a process for producing a waveguide comprising patternwise irradiating laser light having uneven distribution of intensity on a transparent matrix base containing a photo-reactive substance having a refractive index controlling activity to form a region in which the polymerization rate or the crosslinking rate is varied.

According to the present invention, irradiation of a photo-reactive substance with laser light having an uneven distribution of intensity results in differences in polymerization rate or crosslinking rate in proportion to the differences in amount of reaction based on the light intensity distribution to thereby provide at least one region having uneven distribution of polymerization rate or crosslinking rate. Since light intensity distribution of laser light usually shows a Gaussian distribution, the polymerization rate or crosslinking rate in the irradiated region continuously varies in accordance with the Gaussian distribution. The region in which a polymerization rate or crosslinking rate is continuously varied will be hereinafter simply referred to as a distribution region.

The mode of distribution of the polymerization rate or crosslinking rate can be controlled arbitrarily by adjustment of the irradiation dose or scanning conditions of laser light. The irradiation dose can be adjusted by irradiation time, the position of a laser beam, the diameter of a laser beam, and the like. Therefore, the process of the present invention is suitable for formation of a distribution region on an industrial scale. Since distribution regions having a standardized form can regularly be formed with ease, microlenses, etc., can be arrayed with good precision at a high density.

DETAILED DESCRIPTION OF THE INVENTION

Figure 1:
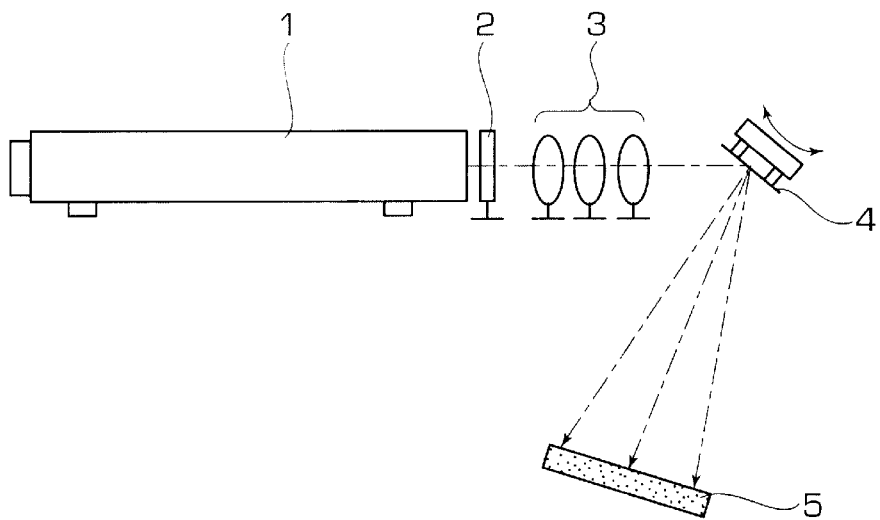
FIG. 1 illustrates a schematic view of an apparatus which can be used to conduct the present invention.

The terminology "photo-reactive substance" as used herein includes a photopolymerizable substance and a photo-crosslinkable substance. The photo-reactive substance which can be used in the present invention is not particularly limited.

The object to be irradiated with laser light comprises a combination of a transparent matrix and at least one photopolymerizable substance or photo-crosslinkable substance; the photopolymerizable or photo-crosslinkable substance may undergo photo-reaction on irradiation with laser light. The matrix materials which can be used in the present invention include a monomer, an oligomer, a resin, glass or any other inorganic substance. The shape, size, thickness and the like of the object may be selected arbitrarily. While the surface properties of the object are also arbitrary, the object preferably has a smooth surface in order to prevent scattering of irradiated light so as to improve controllability of the reaction rate. The object does not need to be a solid at the stage of irradiation and may be an object which can be solidified by an appropriate treatment after irradiation, such as a heat treatment or exposure to light.

Suitable objects of laser light irradiation include those composed of a matrix selected from a photopolymerizable or photo-crosslinkable polymer, glass or inorganic crystal or a composite material thereof and a non-photopolymerizable or non-photo-crosslinkable polymer, glass or inorganic crystal or a composite material thereof containing a photo-reactive substance, such as a photopolymerizable or photo-crosslinkable monomer or a mixture thereof or photosensitive glass, etc. If desired, the object may contain a photo-reaction initiator or a photosensitizer. Usable photo-reaction initiators include photopolymerizable or photo-crosslinkable substances and radical initiators.

The object of laser light irradiation may be a transparent sheet comprising a matrix base containing at least one photo-reactive substance. The matrix bases used include those showing transparency to the light irradiated, such as polyolefins, various synthetic rubbers, polyvinyl chloride, polyester, polyamide, cellulose derivatives, polyvinyl alcohol, polyacrylates, polymethacrylates, polyurethane, polyurethane acrylate, and epoxy acrylate.

The photo-reactive substances incorporated into the matrix base include substances which undergo a reaction, such as polymerization, curing, addition or combination, among themselves or via a matrix upon being irradiated with laser light to provide a polymerized structure or a crosslinked structure based on the reaction mode of themselves or with a matrix. Examples of the photo-reactive substances include photopolymerizable monomers, e.g., tribromophenoxyethyl acrylate and trifluoroethyl acrylate, and photo-crosslinkable monomers having at least two photo-reacting functional groups, e.g., divinylbenzene. Physical properties of the resulting irradiation product, such as a refractive index, can appropriately be controlled according to the kind of the photo-reactive substance used.

Formation of the photo-reactive substance-containing matrix base is not particularly restricted. For example, a base-forming polymer, etc. and a photo-reactive substance are mixed with or without a solvent, and the mixture is cast to obtain a sheet; or a photo-reactive substance with or without a solvent is impregnated into a previously formed matrix base. The amount of a photo-reactive substance to be incorporated into a matrix base is appropriately selected according to a desired rate of polymerization or crosslinking or a desired distribution thereof. In general, it is used in an amount of not more than 200 parts by weight, and particularly not more than 100 parts by weight, per 100 parts by weight of a matrix base. While not limiting, the thickness of the matrix base is usually from 1 $\mu$m to 50 cm.

Laser light irradiated onto the thus prepared object should have a distribution of intensity so as to form a distribution region having distribution of a polymerization rate or crosslinking rate corresponding to the distribution of light intensity. If desired, the object either before or after the irradiation may be subjected to an appropriate treatment, such as development, heating, pre-exposure, post-exposure, and a solvent treatment.

Laser light irradiation can be carried out by means of an appropriate laser oscillator according to the reactive wavelength of the photo-reactive substances present in the object, i.e., a photopolymerizable or photo-crosslinkable substance, a photo-reaction initiator, and a photosensitizer. A laser oscillator capable of forming a beam having a circular section and having a zero-order or first-order Gaussian distribution of intensity is preferred.

Examples of laser oscillators generally employed include those emitting laser light of relatively short wavelength, such as an excimer laser, an argon laser, and a helium-cadmium laser. Depending on the photo-reaction initiator or photosensitizer used a helium-neon laser having a relatively long oscillation wavelength may be used. Further, a laser of longer wavelength, e.g., a YAG laser, if necessary with the wavelength converted to third harmonics, etc., may also be employed. Of those, an argon laser, a helium-cadmium laser or the like is preferably used.

In FIG. 1 is shown an apparatus for conducting the process of the present invention, which comprises laser oscillator 1, shutter 2, condensing element 3 (e.g., lenses, mirrors, filters, etc.), and optical system 4 for scanning. Laser light (shown by an arrow) from laser oscillator 1 is condensed through condensing element 3 into a beam of adjusted size, which is then reflected on optical system 4 to the direction of object 5. The position of irradiation and the track of scanning are decided by controlling optical system 4. Shutter 2 is to control the passage of laser light to condensing element 3. It is preferable for control of the photo-reaction rate that shutter 2 be controlled together with condensing element 3 and/or optical system 4. The control of shutter 2 can easily be effected with equipment of personal computer level.

Distribution of the polymerization rate or crosslinking rate can be controlled by, for example, adjustment of the irradiation time, the intensity of the light irradiated, the position or the size of the laser light beam, extinction by means of a filter or a transmission-distributed optical mask, or control of the scanning passageway or speed. In the present invention, a distribution region in which the polymerization rate or crosslinking rate continuously changes depicting a smooth curve based on a Gaussian distribution, etc., may be formed by irradiation for a prescribed time without scanning. Alternatively, an arbitrary distribution region may be formed by scanning the laser light. While the diameter of the irradiating beam can be decided appropriately, it is usually from about 0.01 to 200 mm.

Where the above-described scanning system is adopted, a region in which a polymerization rate or crosslinking rate continuously changes along the scanning passageway is formed. In this case, the amount of irradiation per unit distance is adjusted by controlling the degree of condensation or the scanning speed to thereby control the width of the region formed. The region is usually formed on both sides of the scanning passageway. Accordingly, crossing or superposing scanning passageways forms a portion having a different reaction rate from the other scanned portions.

The form of the distribution region formed by laser light irradiation is not limited. That is, the distribution may exist in either the whole or a part of an object, and a plurality of distribution regions may be formed to provide an array of lenses. The form and surface conditions of the distribution region are not limited, either. Where a plurality of distribution regions are formed, the shape, the position, and the number of the regions are arbitrary. The mode or pattern of distribution in the region can be decided appropriately depending on the end use.

Further, by selecting a laser having a high degree of parallelism, a lens or lens array having an excellent uniformity in a thickness direction can be obtained.

After the laser light irradiation, any unreacted photo-reactive substance and the like remaining in the irradiated article may be removed if necessary by an appropriate means, for example, extraction with a solvent or vaporization by heating according to the substance removed. That is, the object either before or after the irradiation may be subjected to an appropriate treatment, such as development, heating, pre-exposure, post-exposure, and a solvent treatment.

The process of the present invention is applicable to various purposes, such as production of a refractive index-distributed lens or an array thereof, production of a waveguide or an array thereof, partial reinforcement of soft and frail materials, partial softening of brittle materials, improvement of sliding resistance of sliding parts, and production of materials with a gradient function.

More specifically, a lens or a lens array can be produced by irradiating laser light having a distribution of intensity on one or more sites of a transparent matrix base containing a photo-reactive substance to form one or more regions having a varying polymerization rate or crosslinking rate. In this case, a refractive index-distributed lens or an array thereof can be obtained by choosing a photo-reactive substance having a refractive index regulating activity.

A lens plate or a lens array plate comprising a transparent support layer having thereon or therein one or more convex lens regions comprising a photopolymer can be produced by forming one or more regions having distribution of polymerization rate by laser light irradiation and then removing the unreacted photopolymerizable substance.

In the above-described process for producing a lens array, use of an optical mask having polygonal openings results in production of a lens array plate comprising a transparent support layer having a plurality of refractive index-distributed lens regions whose outer edge has a polygonal shape.

A waveguide can be produced by patternwise irradiating a transparent matrix base containing a photo-reactive substance having a refractive index regulating activity to form a distribution region having a varying polymerization rate or crosslinking rate.

In the production of a refractive index-distributed lens or an array thereof, when the refractive index is distributed to have a quadratic distribution curve with its apex being in the center of the lens, there is provided a flat lens. In this case, the lens having its maximum refractive index in the center thereof serves as a convex lens, while the lens having its minimum refractive index in the center thereof serves as a concave lens. A single lens or a unit lens constituting a lens array usually has a diameter of from 0.01 to 200 mm.

Since the process of the present invention can provide a distribution region in which the polymerization rate or a crosslinking rate continuously changes, the process can be applied to modification of a part of an article, such as reinforcement or softening without causing drastic change in the composition to be modified in favor of dispersion of a stress. In addition, since the process is capable of forming a distribution region over a length of from 1 $\mu$m to 50 cm or, if desired, even greater, it is also applicable to addition of functions, such as sliding resistance, or formation of gradation of a function without making a distinct boundary and without requiring any joint means.

The present invention will now be illustrated in greater detail by way of Examples, but it should be understood that the present invention is not construed as being limited thereto. All the parts are by weight unless otherwise indicated.

EXAMPLE 1

A bifunctional urethane acrylate-based cured sheet having a thickness of 500 $\mu$m ("UNIDIC V-4220" produced by Dainippon Ink and Chemicals, Inc.) was impregnated with a solution of 10 parts of tribromophenoxyethyl acrylate and 0.1 part of a photo-reaction initiator ("IRGACURE 651" produced by Ciba Geigy) in 10 parts of chloroform, and the chloroform was removed by drying at 50° C. in a dark place. The impregnated sheet was irradiated with a laser beam having a diameter of 1.2 mm emitted from a helium-cadmium laser (output: 7 mW) for 2 ms to cause polymerization of tribromophenoxyethyl acrylate. The sheet was then immersed in methanol to remove unreacted tribromophenoxyethyl acrylate to obtain a polymerization rate-distributed polymer.

EXAMPLE 2

A polymerization rate-distributed polymer was obtained in the same manner as in Example 1, except for changing the beam diameter to 3 mm and the irradiation time to 12 seconds.

EXAMPLE 3

A solution consisting of 100 parts of methyl methacrylate and 0.1 part of IRGACURE 651 was put in a container having been treated with a release agent. The contents were irradiated with laser light in a nitrogen atmosphere under the same conditions as in Example 1 and then heated to remove the unreacted monomer to obtain a polymerization rate-distributed polymer.

EXAMPLE 4

In 100 parts of chloroform were dissolved 100 parts of poly(vinylcarbazole) and 24 parts of camphorquinone, and the solvent was removed in a dark place. The residue was irradiated with laser light for 5 seconds in the same manner as in Example 1 and then immersed in toluene to remove unreacted camphorquinone, followed by drying to obtain a crosslinking rate-distributed article.

COMPARATIVE EXAMPLE 1

An impregnated sheet prepared in the same manner as in Example 1 was irradiated with ultraviolet light through an optical mask having a 1 mm wide opening. Unreacted tribromophenoxyethyl acrylate was extracted from the irradiated sheet to obtain a polymer.

COMPARATIVE EXAMPLE 2

Both sides of a bifunctional urethane acrylate-based cured sheet having a thickness of 500 $\mu$m were plated with nickel while leaving a circle having a diameter of 1 mm unplated on each side. The Ni-plated sheet was soaked in the same monomer solution as used in Example 1. Immediately after being taken out of the solution, the impregnated sheet was irradiated with ultraviolet light. The Ni-plate layer was removed, and unreacted tribromophenoxyethyl acrylate was removed by extraction to obtain a polymer.

COMPARATIVE EXAMPLE 3

A polymer was prepared in the same manner as in Example 3, except that the same monomer solution as used in Example 1 was irradiated with ultraviolet light through an optical mask having a 1 mm wide opening.

Each of the polymers and crosslinked article obtained in the above-described Examples and Comparative Examples was evaluated by measuring the refractive index distribution with a differential interference microscope (manufactured by CARL ZEISS JENA; hereinafter the same). A refractive index appears as an average of the refractive index of the polymer or crosslinked article and that of the matrix resin based on their concentration ratio. From the average refractive index is decided the polymerization rate or crosslinking rate distribution as a concentration distribution of the polymer or crosslinked article.

Figure 2:
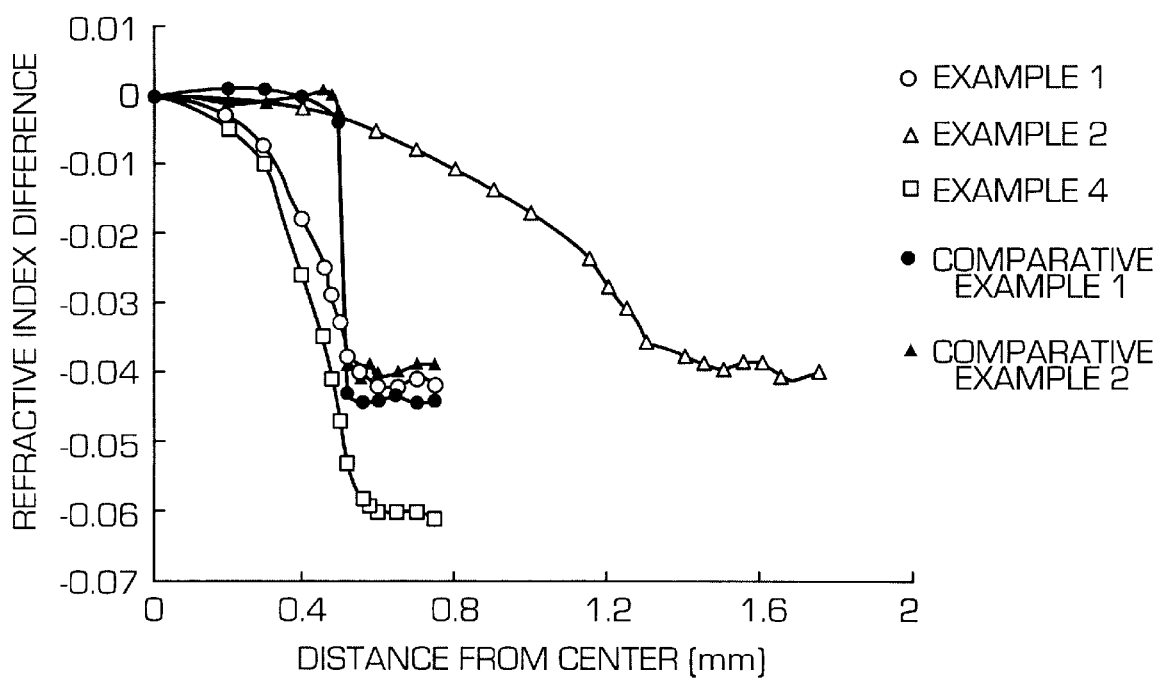
FIG. 2 is a graph showing refractive index distribution of the polymers and crosslinked article obtained in Examples 1, 2 and 4 and Comparative Examples 1 and 2.

The results of Examples 1, 2, and 4 and Comparative Examples 1 and 2 are shown in FIG. 2. In Examples 1, 2, and 4, the refractive index changes substantially continuously, revealing a distribution region in which the polymerization rate or crosslinking rate continuously changes. It is also seen from the results of Examples 1 and 2 that the area having a distribution can be controlled by adjusting the area to be irradiated with laser light. To the contrary, the change in refractive index in Comparative Examples 1 and 2 is stepwise, indicating that there was formed no substantial distribution of polymerization rate.

Figure 3:
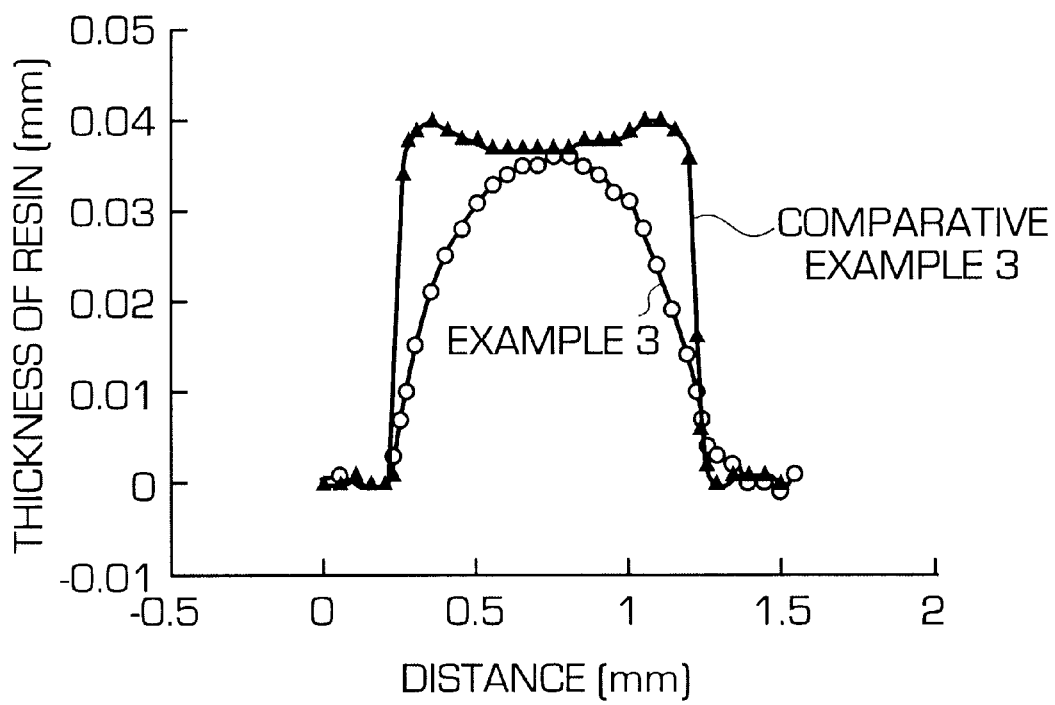
FIG. 3 is a graph showing thickness changes in the polymers obtained in Example 3 and Comparative Example 3.
Figure 4:
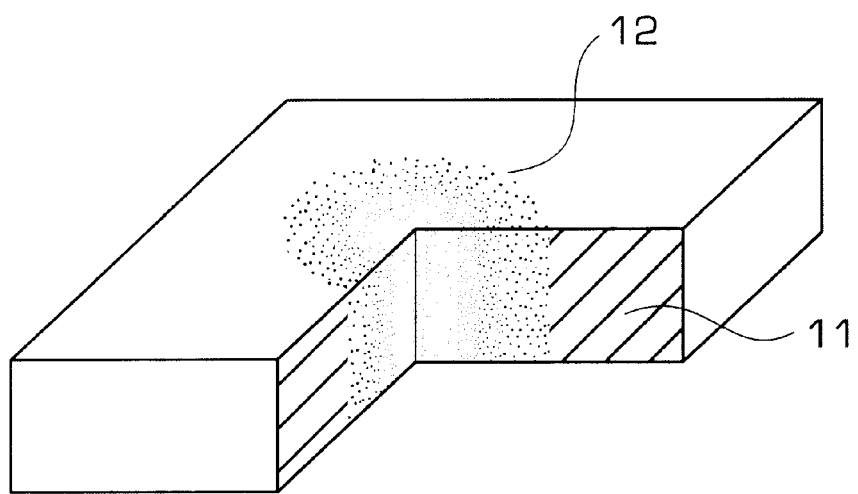
FIG. 4 is a perspective view of a lens with a partial cut area.
Figure 5:
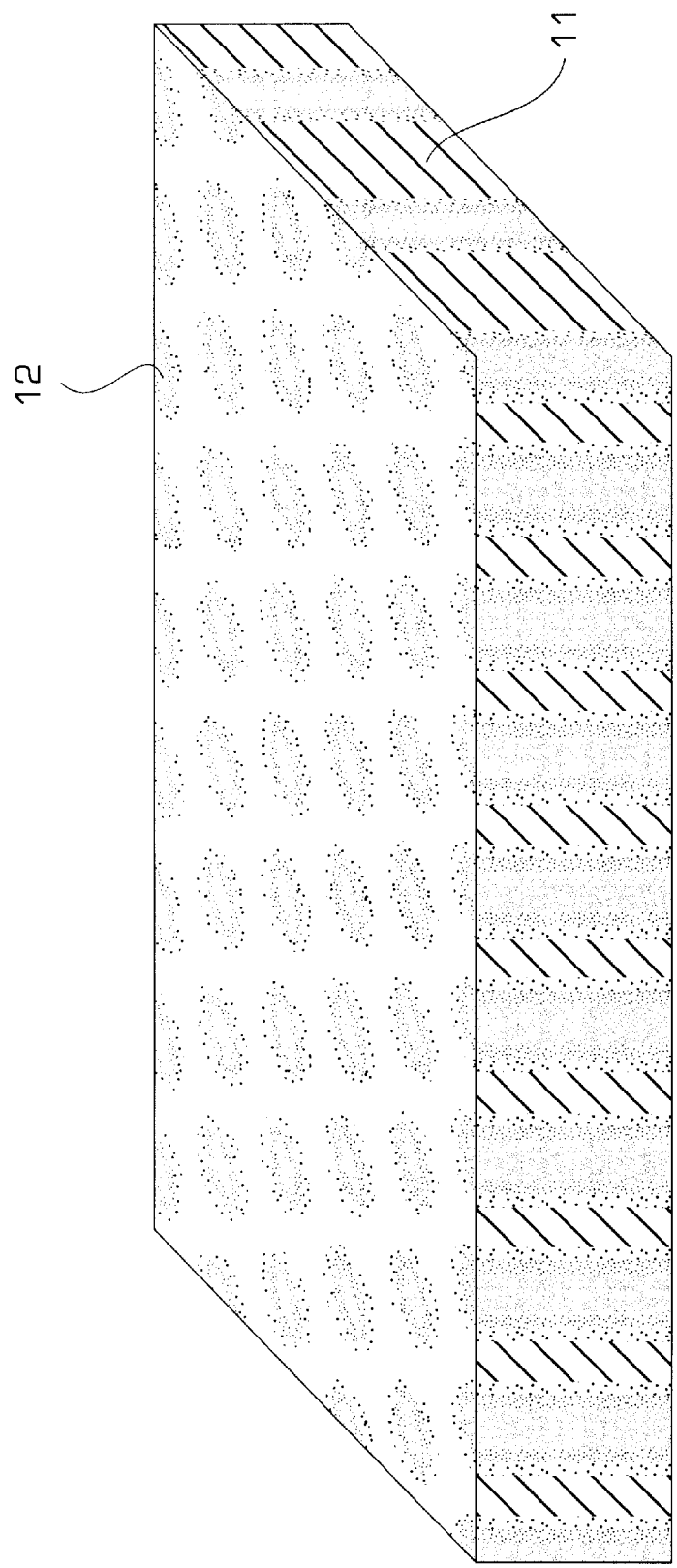
FIG. 5 is a perspective view of a lens array plate with a partial cut area.

On the other hand, the thickness change of the polymers obtained in Example 3 and Comparative Example 3, which indicates a polymerization rate distribution, was examined by measuring the surface roughness. The results obtained are shown in FIG. 3. As shown in FIG. 3, Example 3 depicts a smooth convex curve corresponding to a Gaussian distribution, revealing a distribution region in which the polymerization rate continuously changes. To the contrary, the change in thickness observed in Comparative Example 3 is a result of disturbance due to running of the resin during removal of the unreacted monomer. Such a change in thickness is irregular and uncontrollable.

EXAMPLE 5

Ten parts of poly(methyl acrylate) obtained by solution polymerization, 10 parts of tribromophenoxyethyl acrylate (refractive index-increasing type; refractive index: 1.56), 0.1 part of IRGACURE 651, and 20 parts of ethyl acetate were mixed, and the mixture was cast to obtain a 100 $\mu$m thick film. The cast film was scanned with an argon laser beam having a diameter of 500 $\mu$m for 100 ms per spot. The irradiated film was immersed in methanol to remove unreacted tribromophenoxyethyl acrylate to obtain a lens array plate. Each circular lens had a diameter of about 0.6 mm, and the pitch (center-to-center) of the lenses was about 0.62 mm.

EXAMPLE 6

A lens array plate was prepared in the same manner as in Example 5, except for replacing tribromophenoxyethyl acrylate with trifluoroethyl acrylate (refractive index-reducing type; refractive index: 1.3).

EXAMPLE 7

A bifunctional urethane acrylate-based cured sheet having a thickness of 500 $\mu$m ("UNIDIC 15-829" produced by Dainippon Ink and Chemicals, Inc.) was impregnated with a solution of 10 parts of tribromophenoxyethyl acrylate and 0.1 part of IRGACURE 651 in 10 parts of chloroform. The chloroform was removed from the impregnated sheet in a dark place, and the sheet was then irradiated with laser light in the same manner as in Example 5 to obtain a lens array plate.

COMPARATIVE EXAMPLE 4

The same impregnated sheet as prepared in Example 7 was irradiated with ultraviolet light through an optical mask having openings having a diameter of 500 $\mu$m at intervals of 800 $\mu$m in a closest packing mode. Unreacted tribromophenoxyethyl acrylate was removed by extraction to obtain a lens array plate.

The lens array plates obtained in Examples 5 to 7 and Comparative Example 4 were cut and the cross-sections thereof were observed. As a result, the lens array plates of Examples 5 to 7 had a good uniformity in the thickness direction, but the lens array plate of Comparative Example 4 had an ununiformity in the thickness direction.

Figure 6:
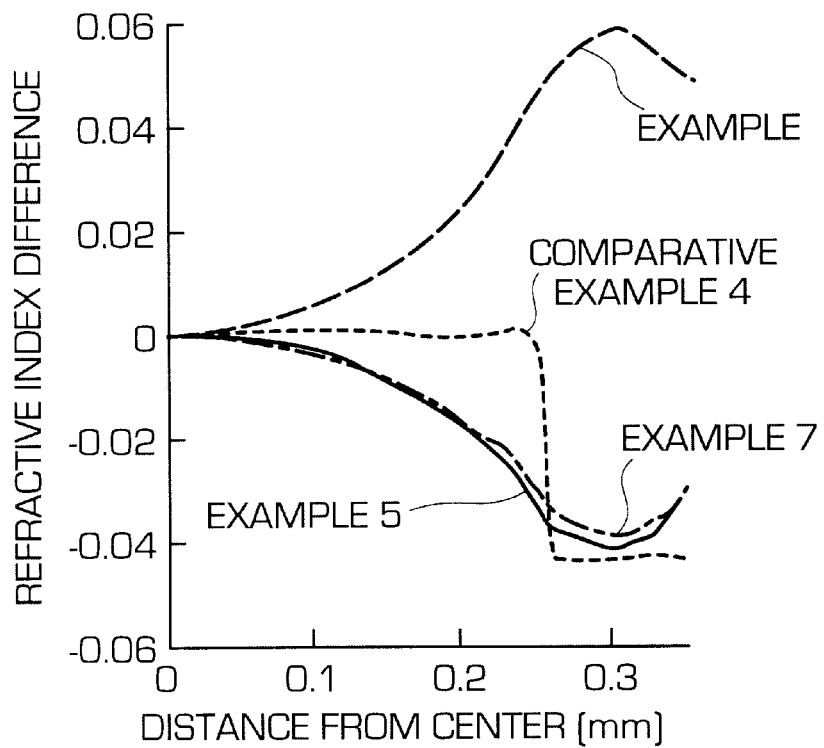
FIG. 6 is a graph showing refractive index distribution of the lens array plates obtained in Examples 5 to 7 and Comparative Example 4.

The refractive index distribution in those lens array plates was determined by means of a differential interference microscope. The results obtained are shown in FIG. 6. It is seen from FIG. 6 that the refractive index in Examples 5 to 7 changes substantially continuously and is also similar to the quadratic distribution curve, whereas the refractive index change in Comparative Example 4 is stepwise.

Further, light transmitted through each lens array plate was visually observed. As a result, each unit lens of Examples 5 and 7 exhibited satisfactory optical characteristics of a convex lens, and each unit lens of Example 6 exhibited satisfactory optical characteristics of a concave lens. To the contrary, the product of Comparative Example 4 showed no lens function.

EXAMPLE 8

A 50 μm thick transparent film comprising a urethane acrylate-based polymer was impregnated with a solution of 1 part of tribromophenoxyethyl acrylate (refractive index: 1.56) and 1 part of IRGACURE 651 in 1 part of chloroform. The impregnated film was irradiated with a helium-cadmium laser beam of zero-order lateral oscillation mode (output: 4.2 mW) for 2 seconds. The irradiated film was immersed in methanol for 6 hours to remove unreacted tribromophenoxyethyl acrylate to obtain a lens plate having a cross section shown in FIG. 7

EXAMPLE 9

Figure 8:
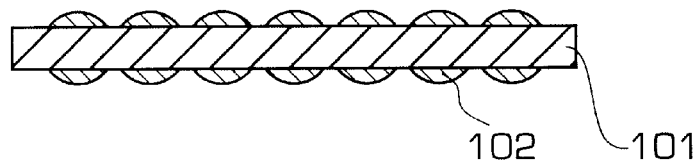
FIG. 8 is a cross section of a lens array plate.

A lens array plate having a cross section shown in FIG. 8 was obtained in the same manner as in Example 8, except that the laser beam was irradiated on 16 spots (4×4) at a center-to-center pitch of 1.1 mm.

EXAMPLE 10

Figure 7:
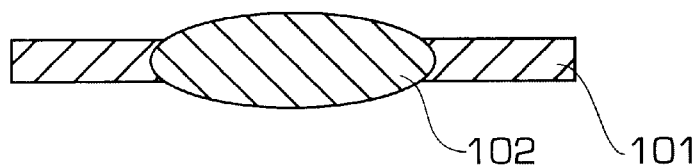
FIG. 7 is a cross section of a lens.

A lens plate of FIG. 7 was obtained in the same manner as in Example 8, except for changing the irradiation time to 6 seconds.

EXAMPLE 11

A lens plate was obtained in the same manner as in Example 8, except that after irradiation for the first 1 second, the beam diameter was reduced to half in the next 1 second.

COMPARATIVE EXAMPLE 5

A lens plate was prepared in the same manner as in Example 8, except that the impregnated film was irradiated with ultraviolet light for 20 seconds through an optical mask having an opening of 1.0 mm in diameter.

Figure 9:
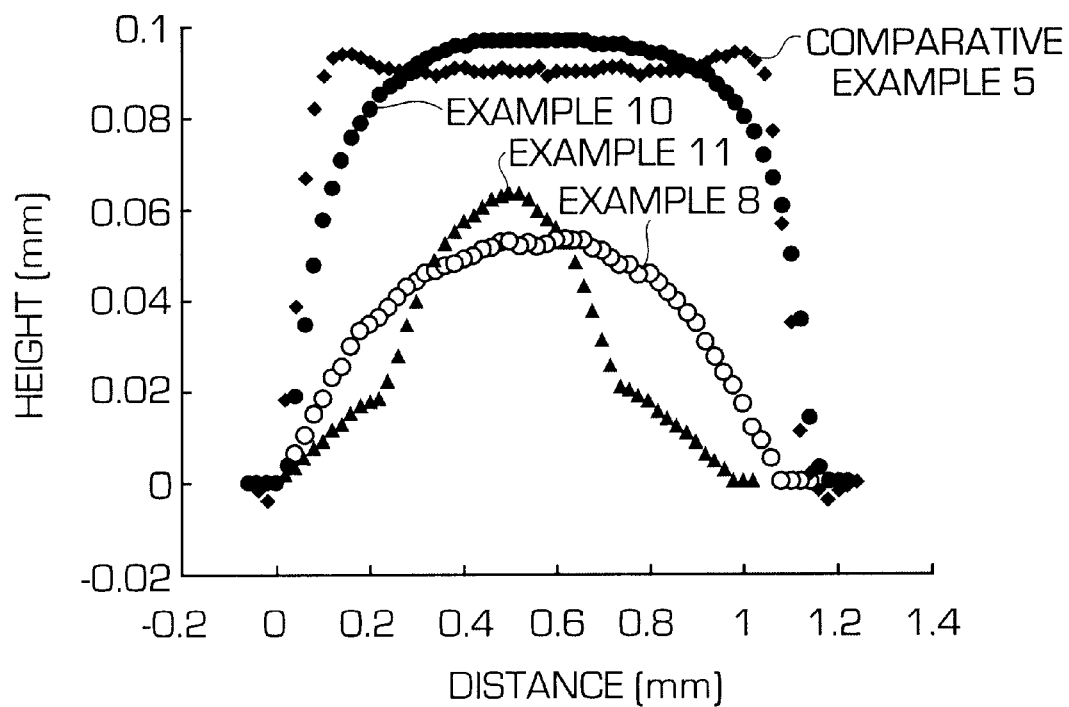
FIG. 9 is a graph showing the shape of lenses obtained in Examples 8, 10 and 11 and Comparative Example 5.
Figure 10:
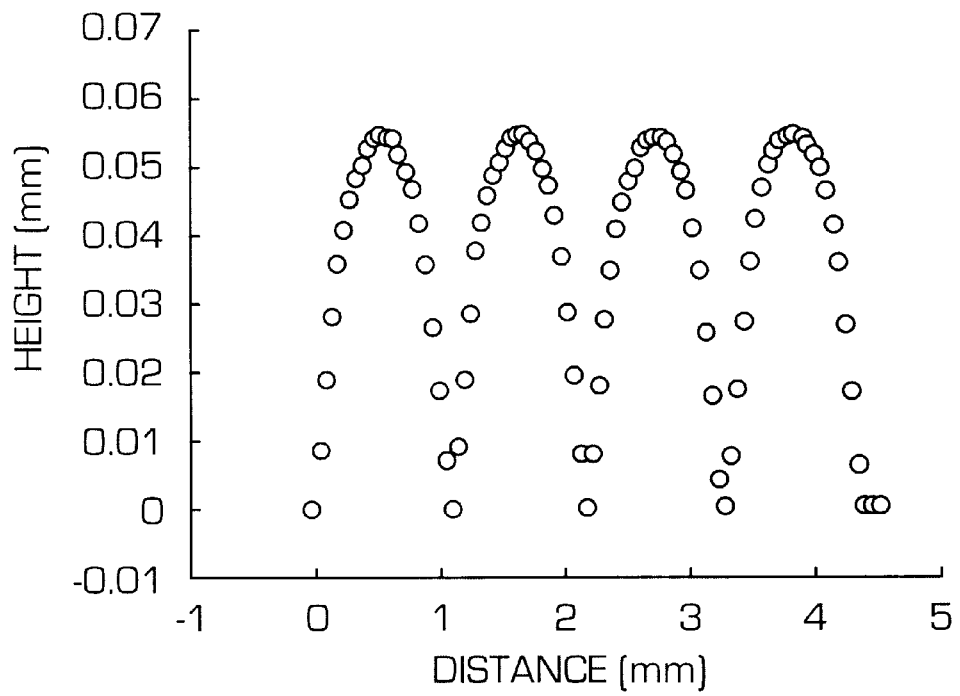
FIG. 10 is a graph showing the shape of the lens array obtained in Example 9.

Thickness change of each of the lens plates obtained in Examples 8, 10, and 11 and Comparative Example 5 and the lens array plate obtained in Example 9 was examined with a surface roughness meter. The results of Example 9 are shown in FIG. 10, and the others in FIG. 9. In FIGS. 9 and 10, the base line of height (0 mm) is the surface of the transparent film support, and the base line of distance (0 mm) is one end of the formed convex lens region.

It is apparent from FIG. 9 that the lens of Example 8 shows convexity having a quadratic surface, that of Example 10 has convexity with a plateau, and that of Example 11 has a double curved surface. On the other hand, no curved surface is formed in Comparative Example 5.

The lens characteristics of each lens were examined. The lens of Example 8 displayed satisfactory convex lens characteristics having a small spherical aberration. The lens of Example 10 exhibited characteristics of an aspherical lens. The lens of Example 11 has satisfactory characteristics of a double focal point lens. To the contrary, no lens function was exhibited in Comparative Example 5.

As shown in FIG. 10, the plate of Example 9 has 4×4 convexities with a quadratic surface each having a diameter of about 1 mm at small intervals of about 0.2 mm. All the unit lenses were regular in shape, i.e., diameter, height, etc. Further, by conducting separate experiments, it was confirmed that various lens array plates can easily be produced by making alterations of the irradiation pitch, the diameter of the laser light beam or the irradiation time.

EXAMPLE 12

Figure 11:
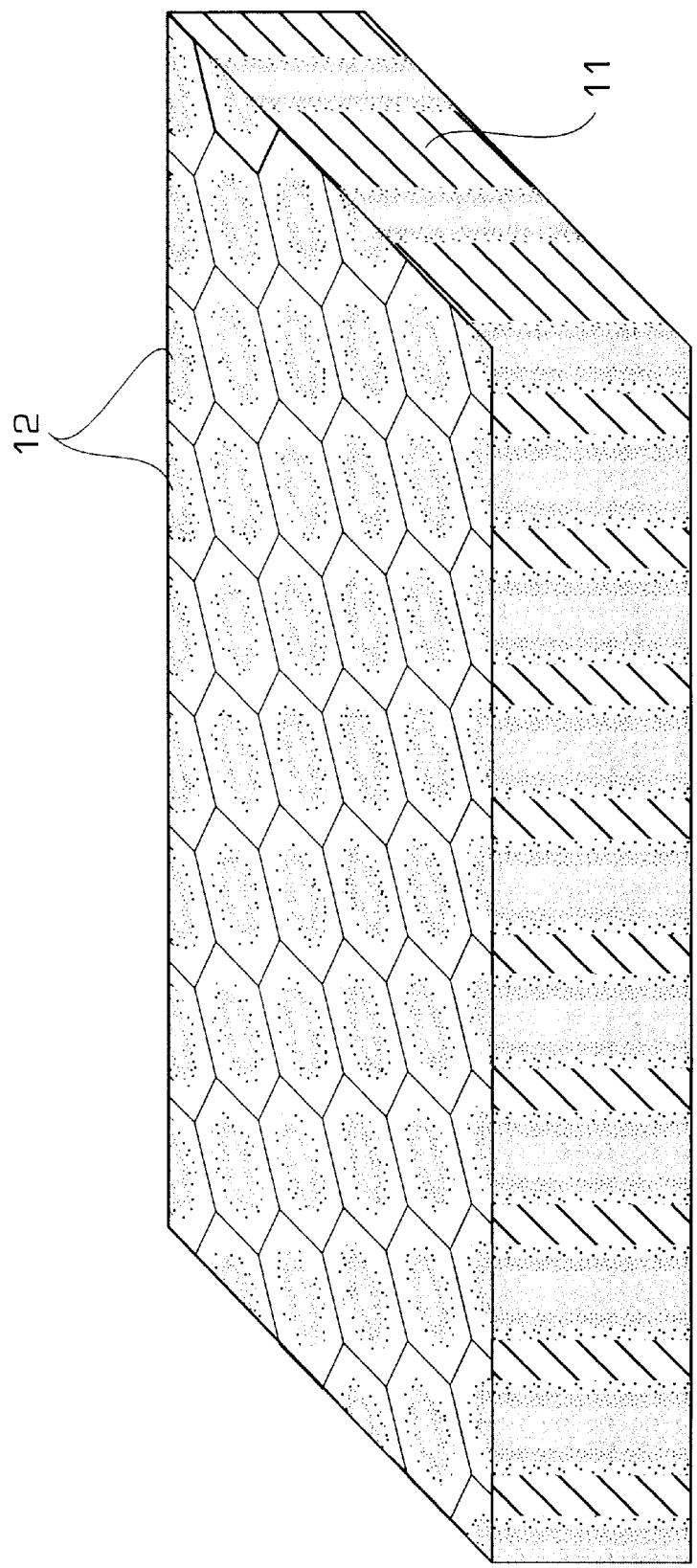
FIG. 11 is a perspective view of a lens array plate prepared in Example 12 with a partial cut area thereof.
Figure 12:
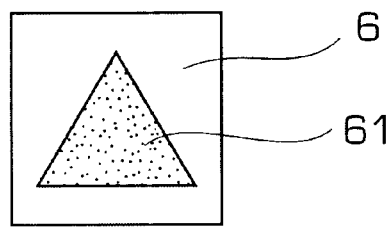
FIGS. 12 through 15 each is a plane view of an optical mask.
Figure 13:
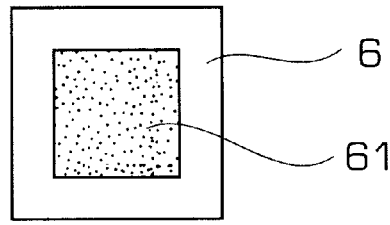
Figure 14:
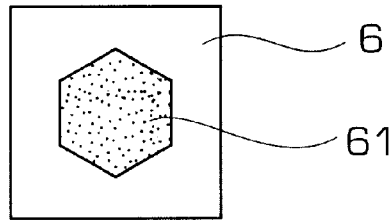
Figure 15:
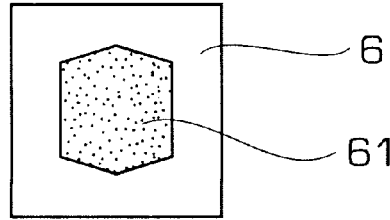

Ten parts of poly(methyl acrylate) obtained by solution polymerization, 10 parts of tribromophenoxyethyl acrylate (refractive index: 1.56), 0.1 part of IRGACURE 651, and 20 parts of ethyl acetate were mixed, and the mixture was cast in a dark place to obtain a 100 μm thick film. The cast film was scanned with a helium-cadmium laser beam having a diameter of 1.2 mm for 2 seconds per spot through an optical mask having hexagonal openings so arrayed as to form distribution regions in a closest packing mode. The optical mask was set between shutter 2 and condensing element 3 with the center of the hexagonal opening being concentric with the center of the laser beam. The irradiated film was immersed in methanol to remove unreacted tribromophenoxyethyl acrylate to obtain a soft lens array plate shown in FIG. 11.

COMPARATIVE EXAMPLE 6

A lens array plate was prepared in the same manner as in Example 12, except for using no optical mask.

COMPARATIVE EXAMPLE 7

A polystyrene rod was immersed with a solution of 100 parts of methyl methacrylate and 1 part of benzophenone, and the monomer was polymerized to obtain a refractive index-distributed rod. The resulting rod was drawn into fiber while heating, followed by cutting. The cut fibers were bundled and adhered together with an epoxy resin under pressure. Both sides of the fiber bundle were cut and scratch polished to obtain a lens array plate.

Figure 16:
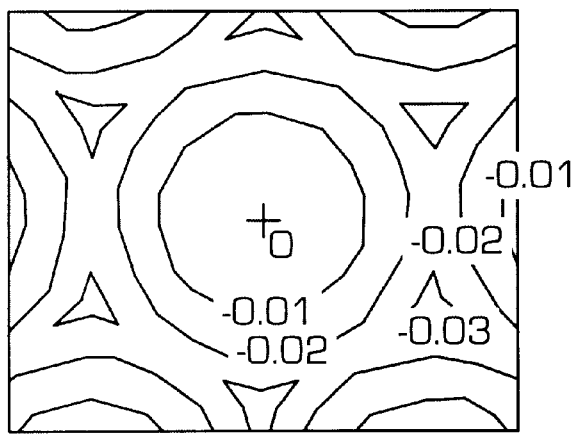
FIGS. 16 through 18 each shows refractive index distribution of a single lens of the lens array plate obtained in Example 12 or Comparative Example 6 or 7, respectively.
Figure 17:
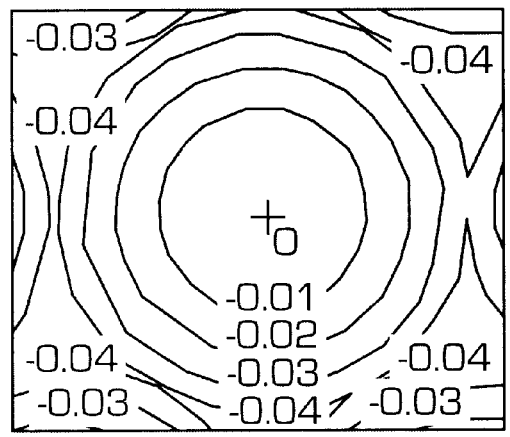
Figure 18:
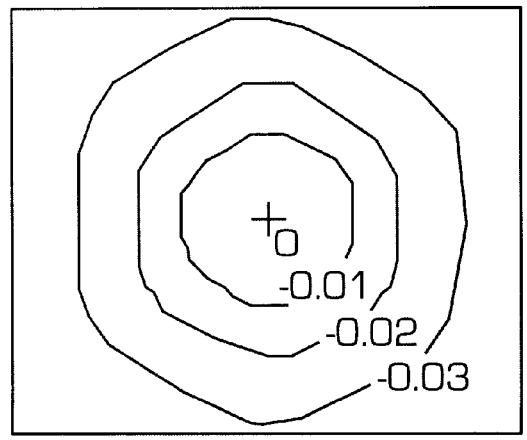

The refractive index distribution in a unit lens of the lens array plate obtained in Example 12 or Comparative Example 6 or 7 was determined with a differential interference microscope. The results obtained are shown in FIGS. 16, 17, and 18, respectively, in which a difference of refractive index from that of the center taken as a standard (0) is depicted as a contour line. In each case, the length of the horizontal line connecting two points on the contour line of the refractive index difference of −0.03 and passing the center was about 1 mm.

It is seen from FIG. 16 that the refractive index of a unit lens of Example 12 changed substantially continuously. The aperture was about 95%, which is much greater than that obtained when circular lenses are arrayed in a closest packing mode (78.5%). The plurality of lens regions formed each had a substantially regular hexagonal shape, the outer edges of which were shared by neighboring regions. The refractive index distribution in each region showed nearly circular and concentric contour lines.

In Comparative Example 6, on the other hand, a large proportion in a unit lens showed no distribution of a refractive index, and the aperture was about 70%. In Comparative Example 7, although an aperture of about 90% was obtained, each unit lens had refractive index distribution shown by hexagonal contour lines and was poor in transmission efficiency.

EXAMPLE 13

Figure 19:
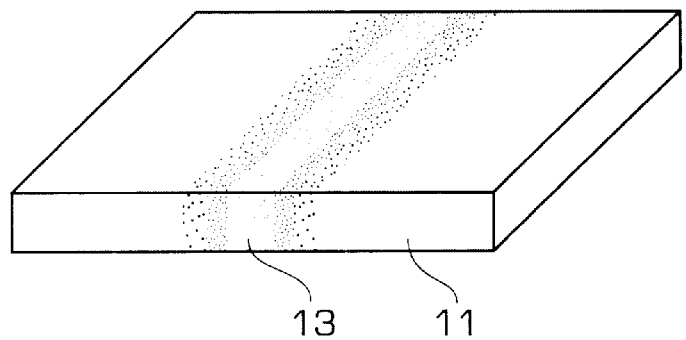
FIG. 19 is a perspective view of a waveguide.

Ten parts of poly(methyl acrylate) obtained by solution polymerization, 10 parts of tribromophenoxyethyl acrylate (refractive index: 1.56), 0.1 part of IRGACURE 651, and 20 parts of ethyl acetate were mixed, and the mixture was cast to obtain a 50 μm thick film. The cast film was scanned with a helium-cadmium laser beam having a diameter of 50 μm at a speed of 10 mm/sec. The film was immersed in methanol to remove unreacted tribromophenoxyethyl acrylate to obtain a refractive index-distributed waveguide shown in FIG. 19.

EXAMPLE 14

Figure 20:
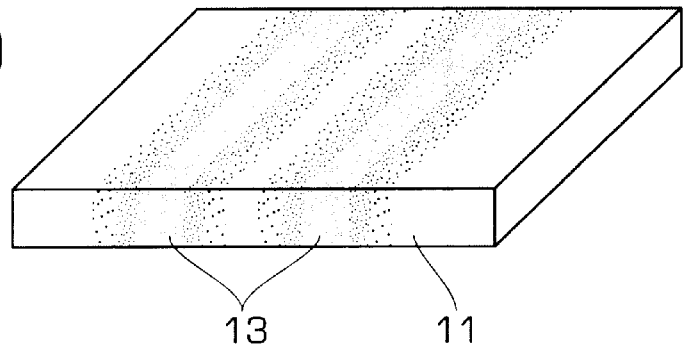
FIG. 20 is a perspective view of a waveguide array.

A waveguide array shown in FIG. 20 was obtained in the same manner as in Example 13, except that the laser beam was scanned along two parallel tracks at a distance of 10 mm to form two parallel refractive index-distributed waveguides.

EXAMPLE 15

A 50 μm thick bifunctional urethane acrylate-based cured sheet was impregnated with a solution of 10 part of tribromophenoxyethyl acrylate and 0.1 part of IRGACURE 651 in 10 parts of chloroform. After removing chloroform in a dark place, the impregnated sheet was irradiated with laser light in the same manner as in Example 13 to obtain a refractive index-distributed waveguide.

EXAMPLE 16

Laser light was linearly scanned on the same impregnated sheet as used in Example 15 in the same manner as in Example 15, then turned in a U-form at a curvature radius of 50 mm, and further linearly scanned to obtain a refractive index-distributed waveguide having a U-form.

COMPARATIVE EXAMPLE 8

The same impregnated sheet as prepared in Example 15 was irradiated with ultraviolet light through an optical mask having 10 μm wide openings at intervals decreasing from 100 μm to 15 μm. Unrelated tribromophenoxyethyl acrylate was removed by extraction to obtain a waveguide array.

Figure 21:
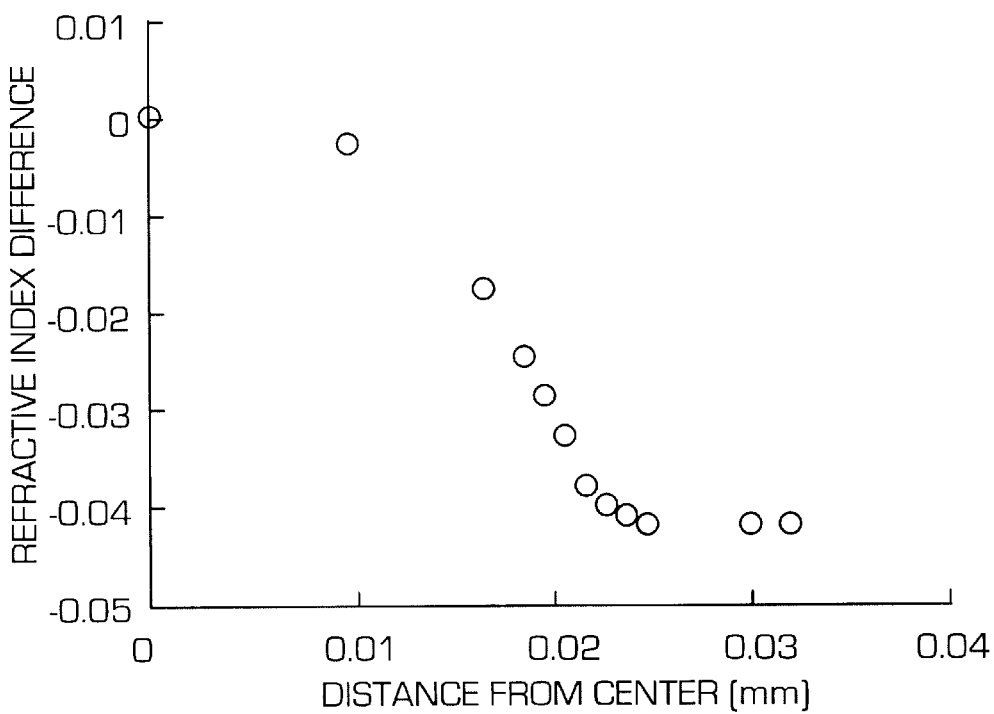
FIGS. 21 and 22 each is a graph of refractive index distribution of the waveguides obtained in Example 13 and Comparative Example 8, respectively.
Figure 22:
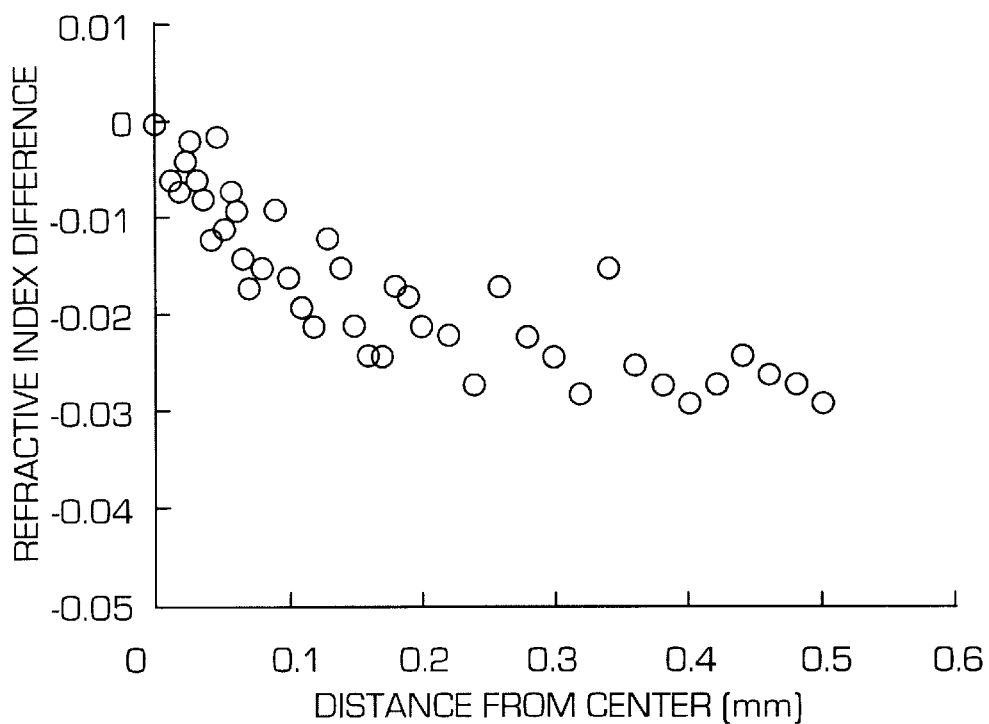

Each of the waveguides obtained in Examples 13 to 16 and Comparative Example 8 was evaluated in terms of refractive index distribution in the width direction by means of a differential interference microscope. The results of Example 13 and Comparative Example 8 are shown in FIGS. 21 and 22, respectively. In these FIGS., the refractive index changes in a half side of the waveguide are shown, taking the refractive index at the center as a standard (0).

FIG. 21 reveals a continuous change of refractive index within a waveguiding width of 49 μm. In Comparative Example 8, the waveguide had a width of 1250 μm in which the refractive index changed stepwise. The transmission zone of the waveguide was 260 MHz in Example 13 and 40 MHz in Comparative Example 8. Further, helium-neon laser light was passed through the waveguide to determine the transmission loss. As a result, the transmission loss was 1.7 dB/cm in Example 13 and 3.6 dB/cm in Comparative Example 8.

On the other hand, the transmission zone of each waveguide of the waveguide array obtained in Example 14 was 260 MHz, the same as in Example 13, and that of Examples 15 and 16 was 270 MHz and 210 MHz, respectively. The transmission loss in Example 15 was 1.7 dB/cm, the same as in Example 13.

In addition to the foregoing Examples, a waveguide having a width of 20 μm could be formed by condensing the beam diameter of laser light.

According to the present invention, a polymerization rate-distributed polymer or a crosslinking rate-distributed article can be formed effectively by irradiation using laser light. The process of the present invention is suitable for mass production. An arbitrary distribution pattern can be designed and formed under good control, and distribution regions having a fine shape can be formed with excellent precision. A plurality of distribution regions having a regular shape can be formed at a high density with high precision.

While the invention has been described in detail and with reference to specific examples thereof, it will be apparent to one skilled in the art that various changes and modifications can be made therein without departing from the spirit and scope thereof.

What is claimed is:

1. A process for producing a lens or a lens array comprising irradiating laser light having a zero-order Gaussian distribution of intensity through an optical mask having a plurality of polygonal openings on a plurality of sites of a matrix base, said matrix base comprising a transparent polymer matrix and a polymerizable photo-reactive substance comprised of a polymerizable monomer and a photo-reactive initiator, to polymerize the monomer and form in the matrix base at least one region in which polymerized monomer is present in a polymerization rate distribution substantially corresponding to a quadratic distribution curve.

2. A process as claimed in claim 1, wherein said photo-reactive substance has a refractive index regulating activity and said lens or lens array has distribution of a refractive index.

3. A process as claimed in claim 1, wherein the process further includes removing unreacted polymerizable monomer after the irradiation to form at least one convex lens region.

4. A process as claimed in claim 1, wherein said matrix base contains not more than 200 parts by weight of said photoreactive substance per 100 parts by weight of the matrix base.

5. A process as claimed in claim 1, wherein said transparent polymer matrix is selected from the group consisting of polyolefins, synthetic rubbers, polyvinyl chloride, polyester, polyamide, cellulose derivatives, polyvinyl alcohol, polyacrylates, polymethacrylates, polyurethane, polyurethane acrylate, and epoxy acrylate resin.

* * * * *